US008651533B2

(12) United States Patent
Shahidehpour et al.

(10) Patent No.: US 8,651,533 B2
(45) Date of Patent: Feb. 18, 2014

(54) DUCT MATING ASSEMBLY

(75) Inventors: Samaneh Shahidehpour, Ann Arbor, MI (US); Atsushi Kobayashi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 2050 days.

(21) Appl. No.: 11/349,515

(22) Filed: Feb. 7, 2006

(65) Prior Publication Data

US 2008/0012341 A1 Jan. 17, 2008

(51) Int. Cl.
*F16L 25/00* (2006.01)

(52) U.S. Cl.
USPC .......................................... 285/424; 454/127

(58) Field of Classification Search
USPC ......... 285/404, 403, 399, 424, 921, 184, 185, 285/181, 179.2; 454/155, 127, 306; 296/208; 49/57; 292/1, 256, 288; 180/68.1, 68.2, 68.3
See application file for complete search history.

(56) References Cited

U.S. PATENT DOCUMENTS

| 99,459 | A | * | 2/1870 | Morrison | 285/185 |
|---|---|---|---|---|---|
| 911,368 | A | * | 2/1909 | Blakestad et al. | 285/114 |
| 942,466 | A | * | 12/1909 | Schnuerer | 285/332 |
| 952,938 | A | * | 3/1910 | Pannenborg | 285/179.2 |
| 1,155,761 | A | * | 10/1915 | Scherer | 285/47 |
| 1,179,322 | A | * | 4/1916 | Johnson | 285/123.16 |
| 1,758,705 | A | | 2/1929 | Kean | |
| 3,018,711 | A | | 4/1958 | Welch et al. | |
| 3,065,002 | A | * | 11/1962 | Waalkes et al. | 285/315 |
| 3,429,594 | A | * | 2/1969 | Stedfeld | 285/317 |
| 3,648,592 | A | | 3/1972 | Nieboer | 98/107 |
| 3,927,607 | A | | 12/1975 | Jobst | 98/2.09 |
| 4,046,409 | A | * | 9/1977 | Virgin | 285/305 |
| 4,850,621 | A | * | 7/1989 | Umehara | 285/322 |
| 5,290,974 | A | * | 3/1994 | Douglas et al. | 181/228 |
| 5,328,213 | A | * | 7/1994 | Barth | 285/181 |
| 5,361,577 | A | * | 11/1994 | Cromer | 285/399 |
| 6,059,338 | A | * | 5/2000 | Diederichs | 285/55 |
| 6,183,360 | B1 | | 2/2001 | Luter, II et al. | 454/366 |
| 6,663,483 | B2 | | 12/2003 | Nishimori et al. | 454/155 |
| 6,783,173 | B2 | | 8/2004 | Nakamura et al. | 296/208 |
| 6,863,340 | B2 | | 3/2005 | Kawahigashi | 296/208 |

FOREIGN PATENT DOCUMENTS

JP 57196031 12/1982
JP 63220036 9/1988

* cited by examiner

*Primary Examiner* — Aaron Dunwoody
(74) *Attorney, Agent, or Firm* — Gifford, Krass, Sprinkle, Anderson & Citkowski, P.C.

(57) ABSTRACT

A duct mating assembly includes first and second ducts having side surfaces connected along their edges to define an interior air space. A coupling portion is formed on one of the first or second ends of the ducts. The coupling portion of the first duct includes first and second sections joined by side sections. The first section of the first duct includes a fifth portion that extends to a sixth portion. A transition portion is positioned between the fifth and sixth portions. The transition portion steps downward and extends forward and then steps back up relative to the fifth portion for preventing air leakage between the first and second ducts. The second section of the first duct includes a first snap feature formed thereon and the fourth section of the second duct including a second snap feature formed thereon, the first and second snap features are operative to connect the second and fourth sections of the first and second ducts.

8 Claims, 4 Drawing Sheets

DUCT MATING ASSEMBLY

FIELD OF THE INVENTION

This invention relates to air ducts, and with more particularity, to an air duct mating assembly.

BACKGROUND OF THE INVENTION

Air ducts are commonly utilized in a motor vehicle to transport air through a heating and cooling system and to circulate air within the compartment of a motor vehicle. Commonly, air ducts in a vehicle include many different components that must be assembled or connected together during an assembly of the vehicle. When mating various ducts, it is essential that they are aligned properly before being secured by a fastener or joining to assure that there are no air leaks within the ventilation system.

Generally, one duct is inserted within the other and then the ducts are joined or fastened together. However, this process usually involves a manual assembly of the ducts in which an operator must align the components together correctly before joining them. Such alignment and manipulation by an operator adds complication to the manufacturing process of the vehicle. There is therefore a need in the art for an improved duct mating assembly that allows for different ducts to be coupled in an efficient manner. There is also a need in the art for an improved duct mating assembly that assures that the ducts are aligned properly to prevent air leakage and is cost effective.

SUMMARY OF THE INVENTION

A duct mating assembly includes a first duct having connected side members that define an interior air space. The first duct extends from a first end to a second end. The coupling portion is formed on one of the first or second ends and includes upper and lower sections joined by side sections. A second duct also having connected side members defining an interior air space is provided. The second duct extends from a first end to a second end and again includes a coupling portion formed on one of the first or second ends. The coupling portion includes upper and lower sections joined by side sections. The first and second ducts are operative to couple with each other. The upper section of the first duct includes a rear portion that extends forward to a front portion. A transition portion is positioned between the rear and front portions. The transition portion steps downward and extends forward and then steps back up to the front portion for preventing air leakage between the first and second ducts.

DETAILED DESCRIPTION OF THE PREFERRED EMBODIMENTS

Figure 1:
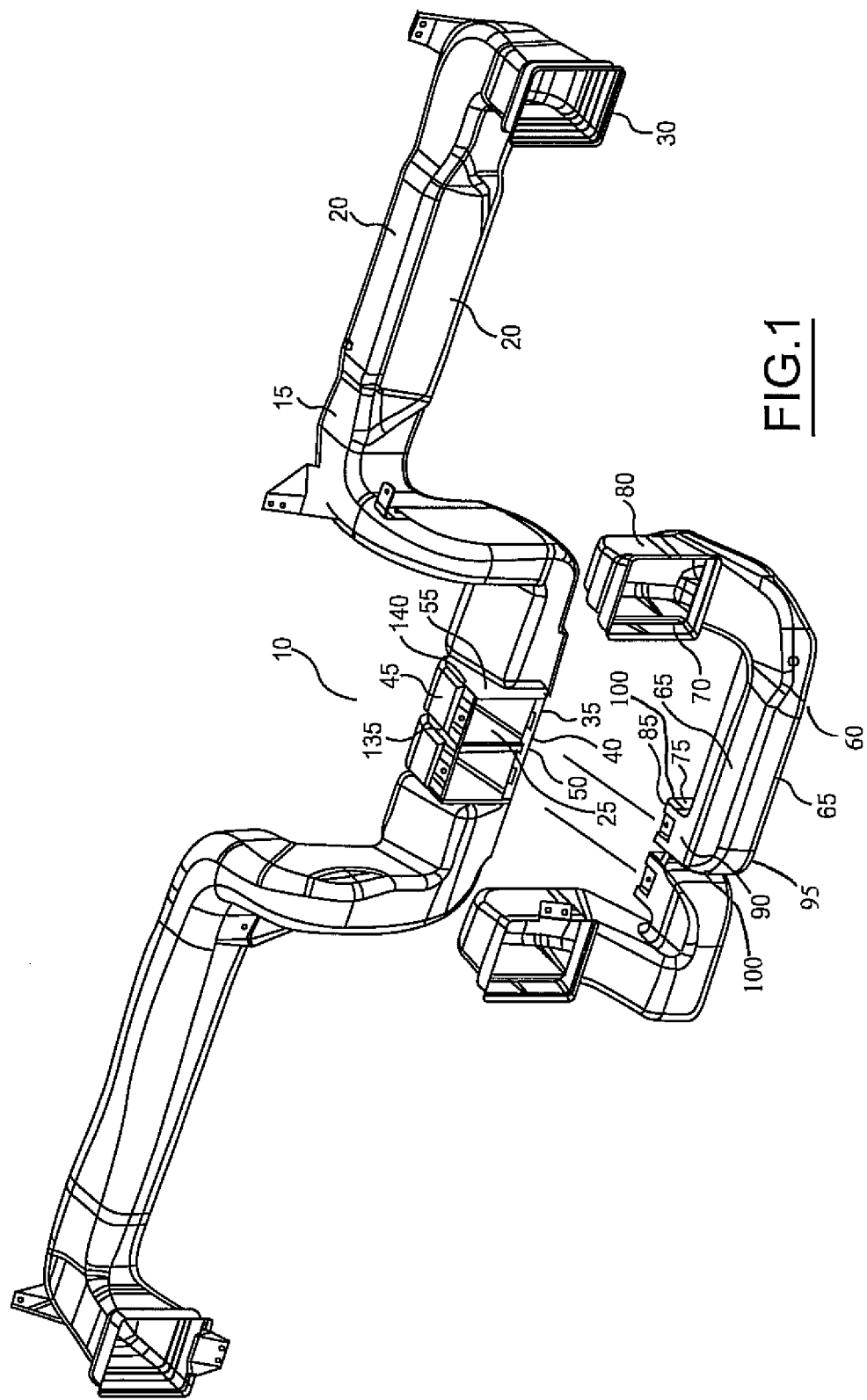
FIG. 1 is a perspective view of a duct mating assembly according to the present invention prior to coupling of the ducts.

Referring to FIG. 1, there is shown a duct mating assembly 10 according to the present invention. The duct mating assembly 10 includes a first duct 15 that has connected side members 20 connected along their edges defining an interior air space 25. The first duct 15 extends from a first end 30 to a second end 35. A coupling portion 40 is formed on one of the first and second ends 30, 35. In the accompanying drawings, the second end includes the coupling portion 40. The coupling portion 40 includes first and second sections 45, 50 joined by side sections 55.

Figure 2:
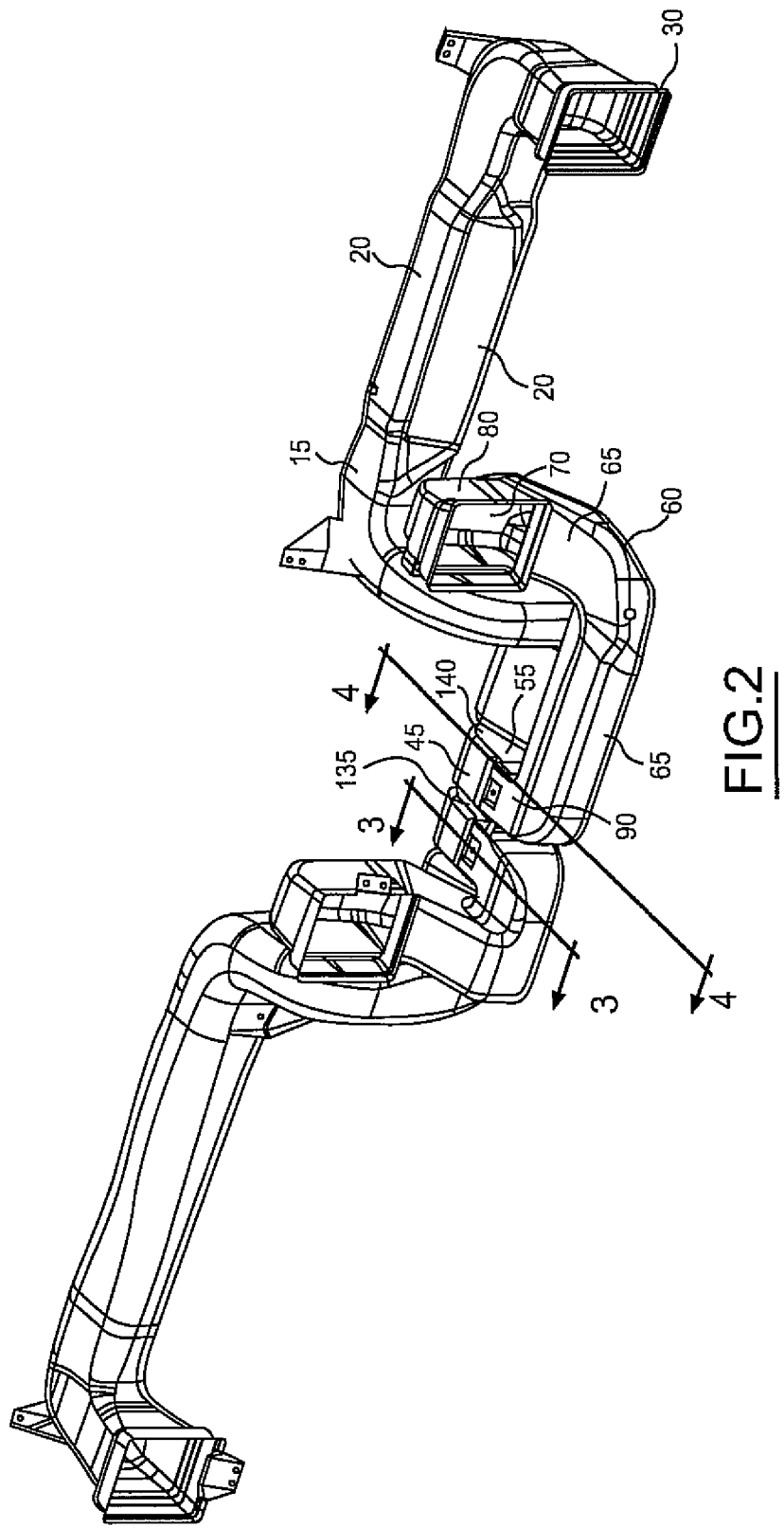
FIG. 2 is a perspective view of a duct mating assembly with the first and second ducts coupled together.

The duct mating assembly also includes a second duct 60 having connected side members 65 connected along their edges that define an interior air space 70. The second duct 60 again extends from a first end 75 to a second end 80 and includes a coupling portion 85 formed on either of the first or second ends 75, 80. The coupling portion 85 includes third and fourth sections 90, 95 joined by side sections 100. The first and second ducts 15, 60 are operative to couple with each other, as shown in FIG. 2.

Figure 4:
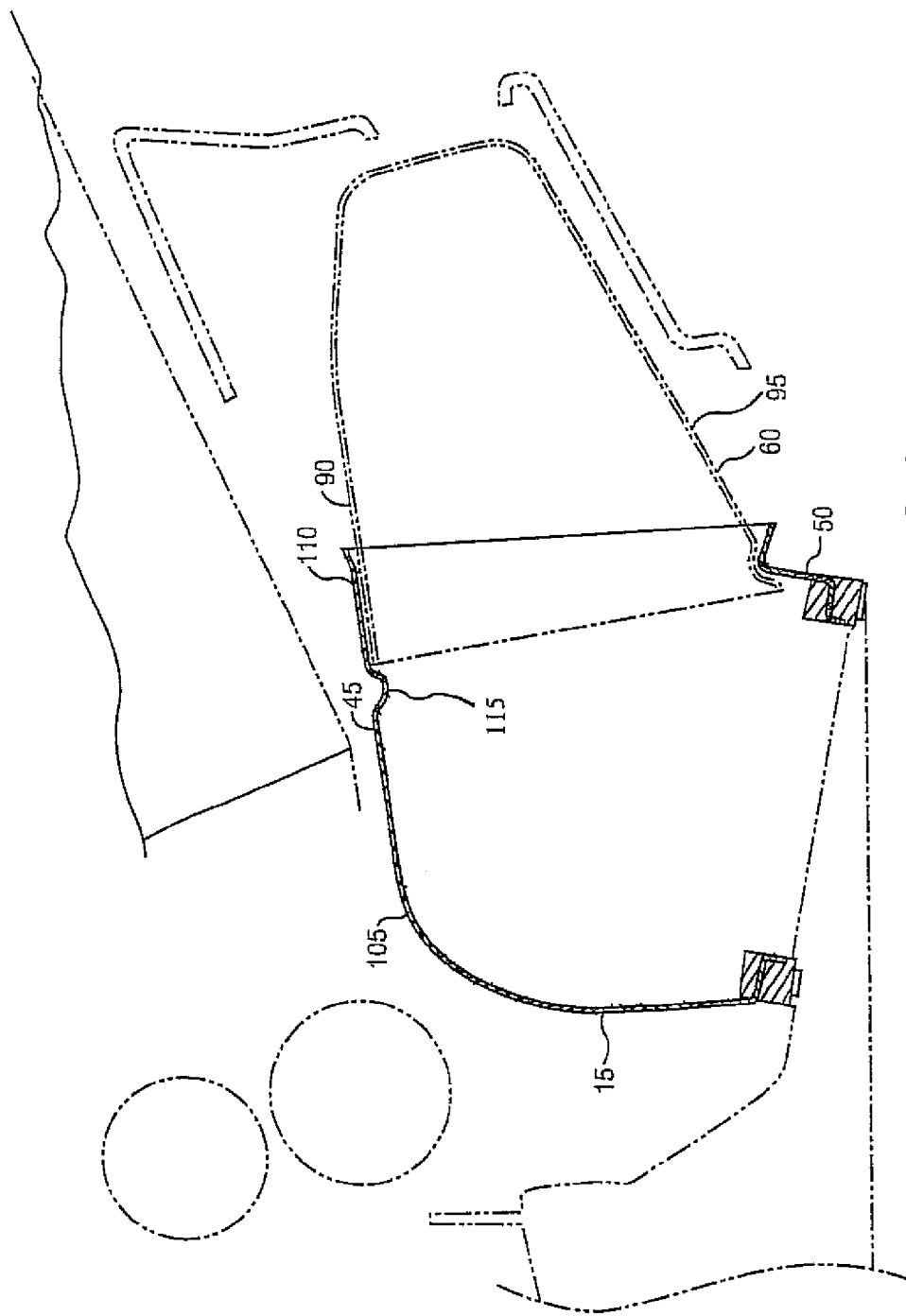
FIG. 4 is a sectional view taken along the line 4:4 of FIG. 2.

The first section 45 of the first duct 15 includes a fifth portion 105 that extends to a sixth portion 110. A transition portion 115 is positioned between the fifth and sixth portions 105, 110. As best shown in FIG. 4, the transition portion 115 steps downward and extends forward before stepping back up relative to the sixth portion 110. The transition portion 115 prevents air leakage between the first and second ducts 15, 60.

Figure 3:
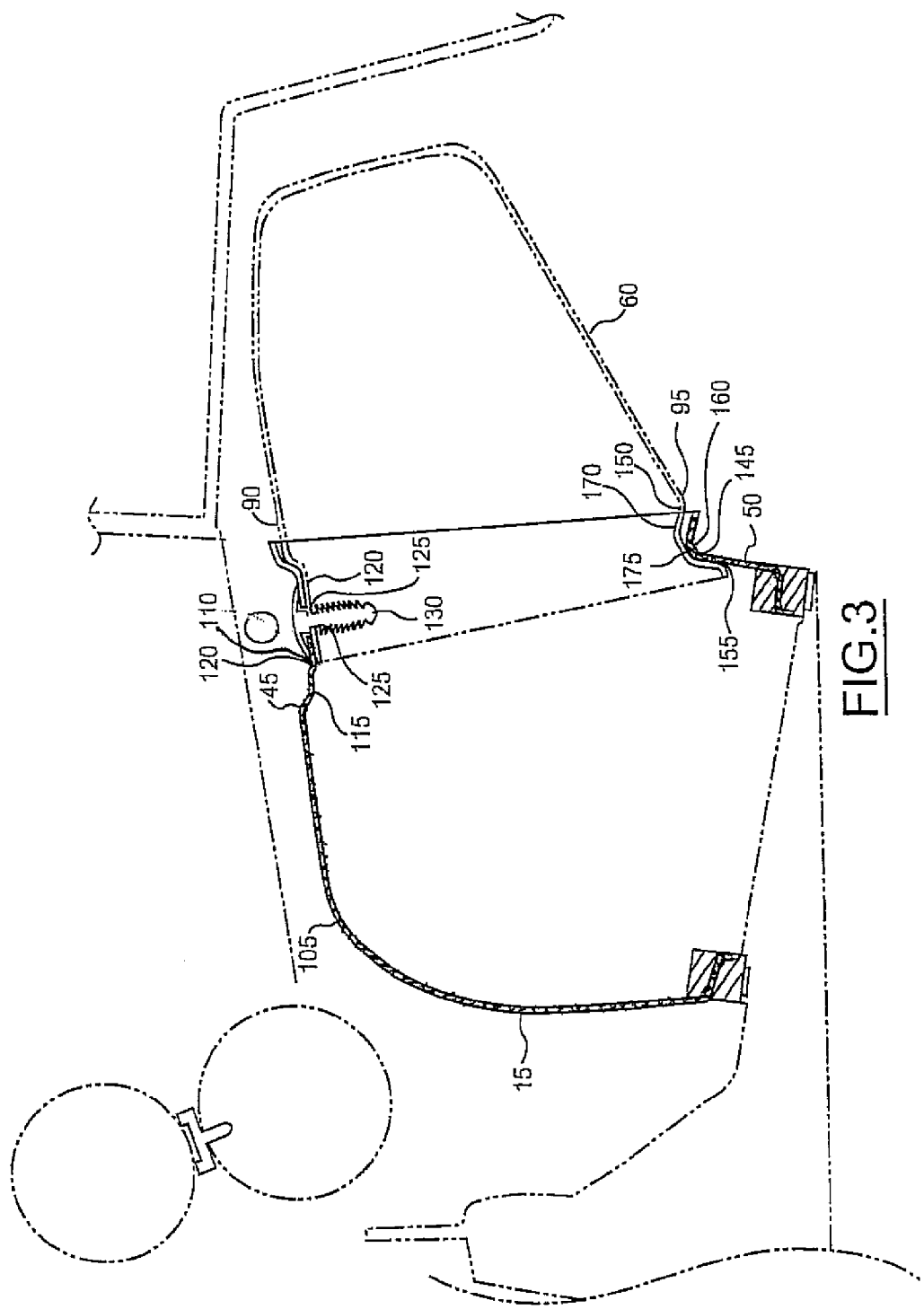
FIG. 3 is a sectional view taken along the line 3:3 of FIG. 2.

The first and third sections 45, 90 of both the first and second ducts 15, 60 include embossments 120 formed thereon. As best shown in FIG. 3, the embossment 120 of the second duct 60 is nested within the embossment 120 of the first duct 15 when the first and second ducts 15, 60 are coupled, as best shown in FIG. 3. In one aspect of the invention, the embossments 120 include slots 125 formed therein to allow passage of a fastener 130 to join the first and second ducts 15, 60. The first and third sections 45, 90 of the first and second ducts 15, 60 extend laterally from a first side 135 to a second side 140, as seen in FIG. 1. In one aspect of the invention, the embossments 120 are positioned midway between the first and second sides 135, 140 of the first and third sections 45, 90. While it is shown that the embossments 120 are positioned midway, it should be realized that the embossments may otherwise be positioned laterally between the first and second sides 135, 140 as the need requires. The embossment 120 formed on the first section 45 of the first duct 15 extends below the step-down portion of the transition portion 115, as best seen in FIG. 3. In this manner, the embossment 120 of the second duct 60 may be nested within the embossment of the first duct 15 to locate the ducts relative to each other and to allow for straightforward insertion of a fastener 130 within the slots 125 formed in the embossments 120 to join the ducts in a secure manner The second section 50 of the first duct 15 includes a first snap feature 145 formed thereon. The fourth section 95 of the second duct 60 also includes a second snap feature 150 formed thereon. The first and second snap features 145, 150 are operative to connect the second and fourth sections 50, 95 of the first and second ducts 15, 60.

As best shown in FIG. 3, the first snap feature 145 includes an angled section 155 extending upward to a contact section 160 and then transitioning downward. The second snap feature 150 includes an angled section 170 that extends upward to a contact section 175 and then transitions downward. The contact section 160 of the first snap feature 145 engages the contact section 175 of the second snap feature 150 when the first duct 15 is coupled with the second duct 60. In this manner, the second and fourth sections 50, 95 of the ducts can be securely retained by the mating of the contact sections 160, 170 of the first and second snap features 145, 150.

When the first duct 15 is assembled with the second duct 60, as shown in FIG. 2, the second duct 60 is moved forward along the lines shown in FIG. 1 to join the first and second ducts 15, 60.

First the fourth section 95 of the second duct 60 is introduced into the second section 50 of the first duct 15. The snap features 145, 150 formed on the first and second ducts 15, 60 are allowed to flex such that the contact portions 160, 170 of the first and second snap features 145, 150 engage as shown in FIG. 3. Next, the second duct 60 may be rotated upwards relative to the first duct 15 such that the third section 90 of the second duct 60 is introduced into the first duct 15. At this point, the embossment 120 formed on the third section 90 of the second duct 60 is nested within the embossment 120 formed on the first section 45 of the first duct 15 such that the first duct 15 and second duct 60 are properly aligned. The slots 125 formed in both the embossments 120 of the first and second ducts 15, 60 are now aligned such that a fastener 130 may be introduced into the slots 125 to securely retain the first and third sections 45, 90 of the first and second ducts 15, 60. The transition portion 115 of the first duct 15 abuts the second duct 60 thereby preventing air leakage between the first and second ducts 15, 60 as shown in FIG. 4.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A duct mating assembly comprising:
a first duct having side members connected along edges of the side members defining an interior air space, the first duct extending from a first end to a second end, and
a coupling portion formed on one of the first or second ends, the coupling portion including first and second sections spaced from each other and joined by side sections;
a second duct having side members connected along edges of the side members defining an interior air space, the second duct extending from a first end to a second end, and a coupling portion formed on one of the first or second ends, the coupling portion including third and fourth sections spaced from each other and joined by side sections;
the first and second ducts operative to couple with each other, wherein the first section of the first duct includes a fifth portion extending to a sixth portion, and a transition portion positioned between the fifth and sixth portions, the transition portion stepping downward and extending forward and then stepping back up relative to the sixth portion for preventing air leakage between the first and second ducts; and
wherein the second section of the first duct includes a first snap feature formed thereon, and the fourth section of the second duct including a second snap feature formed thereon, the first and second snap features operative to connect the second and fourth sections of the first and second ducts wherein the first and third sections of the first and second ducts include embossments formed thereon, the embossment of the second duct nested with the embossment of the first duct when the first and second ducts are coupled.

2. The duct mating assembly of claim 1 wherein the embossments include slots formed thereon for allowing passage of a fastener.

3. The duct mating assembly of claim 1 wherein the first and third sections extend laterally between the side sections.

4. The duct mating assembly of claim 3 wherein the embossment is positioned midway between the side sections of the first and third sections.

5. The duct mating assembly of claim 1 wherein the embossment formed on the first section of the first duct extends below the stepped down portion of the transition portion.

6. A duct mating assembly comprising:
a first duct having side members connected along edges of the side members defining an interior air space, the first duct extending from a first end to a second end, and
a coupling portion formed on one of the first or second ends, the coupling portion including first and second sections spaced from each other and joined by side sections;
a second duct having side members connected along edges of the side members defining an interior air space, the second duct extending from a first end to a second end, and a coupling portion formed on one of the first or second ends, the coupling portion including third and fourth sections spaced from each other and joined by side sections;
the first and second ducts operative to couple with each other, wherein the first section of the first duct includes a fifth portion extending to a sixth portion, and a transition portion positioned between the fifth and sixth portions, the transition portion stepping downward and extending forward and then stepping back up relative to the sixth portion for preventing air leakage between the first and second ducts and;
wherein the second section of the first duct includes a first snap feature formed thereon, and the fourth section of the second duct including a second snap feature formed thereon, the first and second snap features operative to connect the second and fourth sections of the first and second ducts wherein the first snap feature includes an angled section extending upward to a contact section and then transitioning downward.

7. The duct mating assembly of claim 6 wherein the second snap feature includes an angled section extending upward to a contact section and then transitioning downward.

8. The duct mating assembly of claim 7 wherein the contact section of the first snap feature engages the contact section of the second snap feature when the first duct is coupled with the second duct.

* * * * *